(12) United States Patent
Chang et al.

(10) Patent No.: US 8,908,689 B2
(45) Date of Patent: Dec. 9, 2014

(54) APPARATUS AND METHOD FOR PROCESSING PACKET

(75) Inventors: Xiangqing Chang, Beijing (CN); Xiao Li, Beijing (CN); Xudong Zou, Beijing (CN)

(73) Assignee: Hangzhou H3C Technologies Co., Ltd., Hangzhou (CN)

( * ) Notice: Subject to any disclaimer, the term of this patent is extended or adjusted under 35 U.S.C. 154(b) by 1224 days.

(21) Appl. No.: 12/672,110

(22) PCT Filed: Jul. 9, 2008

(86) PCT No.: PCT/CN2008/071592
§ 371 (c)(1),
(2), (4) Date: Feb. 4, 2010

(87) PCT Pub. No.: WO2009/021424
PCT Pub. Date: Feb. 19, 2009

(65) Prior Publication Data
US 2011/0249674 A1  Oct. 13, 2011

(30) Foreign Application Priority Data

Aug. 13, 2007 (CN) .......................... 2007 1 0120218

(51) Int. Cl.
| | |
|---|---|
| *H04L 12/28* | (2006.01) |
| *H04L 12/56* | (2006.01) |
| *H04J 3/24* | (2006.01) |
| *H04L 12/58* | (2006.01) |
| *H04L 12/933* | (2013.01) |
| *H04L 12/931* | (2013.01) |
| *H04L 12/911* | (2013.01) |

(52) U.S. Cl.
CPC ................ *H04L 12/58* (2013.01); *H04L 49/15* (2013.01); *H04L 49/40* (2013.01); *H04L 47/825* (2013.01)
USPC ............................ 370/392; 370/401; 370/474

(58) Field of Classification Search
None
See application file for complete search history.

(56) References Cited

U.S. PATENT DOCUMENTS

| | | | | |
|---|---|---|---|---|
| 6,920,503 | B1 * | 7/2005 | Nanji et al. ................... | 709/230 |
| 7,177,943 | B1 * | 2/2007 | Temoshenko et al. ........ | 709/237 |
| 7,602,775 | B1 * | 10/2009 | Ke et al. ........................ | 370/386 |
| 7,710,972 | B2 * | 5/2010 | Gurumurthy ................. | 370/392 |
| 2005/0215286 | A1 | 9/2005 | Brass et al. | |
| 2008/0137671 | A1 * | 6/2008 | Agarwal et al. .............. | 370/401 |

* cited by examiner

FOREIGN PATENT DOCUMENTS

| | | |
|---|---|---|
| CN | 1466340 A | 1/2004 |
| CN | 1612562 A | 5/2005 |
| CN | 101110772 A | 1/2008 |

OTHER PUBLICATIONS

International Search Report: PCT/CN2008/071592.

*Primary Examiner* — Faruk Hamza
*Assistant Examiner* — Cassandra Decker
(74) *Attorney, Agent, or Firm* — Harness, Dickey & Pierce, P.L.C.

(57) ABSTRACT

The present invention provides an apparatus and method for processing a packet. An interface processing module selects one from all service processing modules as a service processing module for processing a packet; if the service processing module needs to perform tunnel processing for the packet, the service processing module transmits the packet after performing the tunnel processing; if another service processing module needs to perform tunnel processing for the packet, the service processing module transmits the packet to a service processing module needing to perform tunnel processing for the packet. According to the present invention, the packet can be processed uniformly by the service processing module, so it is not unnecessary to store session states in the service processing modules, and also not unnecessary to perform synchronization between the service processing modules, which greatly decreases complexity of processing the packet and saves system bandwidth.

14 Claims, 5 Drawing Sheets

APPARATUS AND METHOD FOR PROCESSING PACKET

FIELD OF THE INVENTION

The present invention relates to network communication technologies, more particularly, to an apparatus and method for processing a packet.

BACKGROUND OF THE INVENTION

When a packet is transmitted in a network, a network device usually needs to perform processing for the received packet and then transmits the packet. Here, all the processing performed for the packet may be called service processing by a joint name, e.g. establishing a session, address transition, and etc. In practical applications contents of the service processing may be different according to different service requirements.

Figure 1:
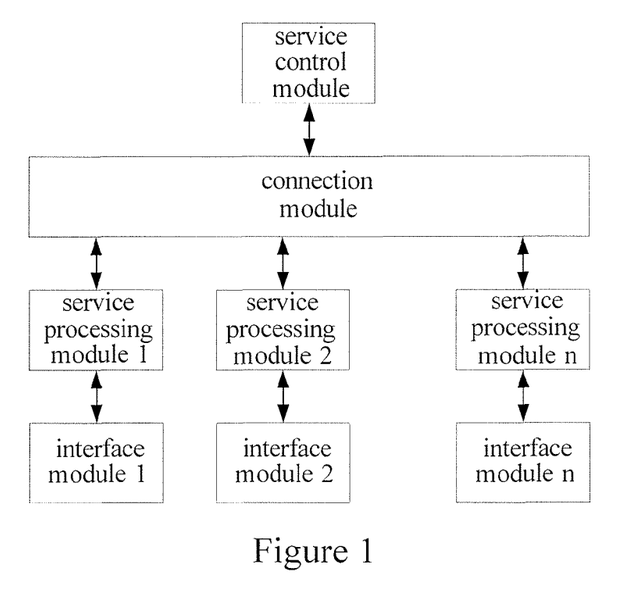
FIG. 1 is a schematic diagram illustrating an internal structure of a typical network device in the prior art.

FIG. 1 is a schematic diagram illustrating an internal structure of a typical network device in the prior art. The network device mainly includes a master control module, service processing modules and interface modules, and all the service processing modules are connected with a service control module in the master control module through a connection module. When a certain interface module, e.g. an interface module 1, in the network device receives a packet, the interface module 1 transmits the received packet to a service processing module 1 which is fixedly connected with the interface module 1, and the service processing module 1 performs service processing for the received packet under the control of the service control module in the master control module. Here, the control of the service control module on the service processing module includes session control information, e.g. a session table, a session processing action, and etc., generated according to an initial packet of a session.

The above mentioned just is a simple service processing for a packet performed by a certain service processing module in the network device. In practical applications, a network device relating to a security product, e.g. a firewall, not only needs to perform general service processing for packets of a session, but also needs to perform tunnel encapsulation for a forward flow of a session and transmit the forward flow, and needs to perform processing relating to tunnel technologies, e.g. decapsulation, for a reverse flow; and usually a specific service processing module is designated to uniformly perform tunnel processing for a certain tunnel. In this way, one packet in the session may be processed by different service processing modules.

For example, the interface module 1 receives a forward flow needing tunnel processing, and transmits the forward flow to the service processing module 1 which is fixedly connected with the interface module 1; after the service processing module 1 performs service processing for the received forward flow and if the service processing module 1 determines that a service processing module 2 corresponding to an interface module 2 should perform tunnel processing, the service processing module 1 transmits the forward flow to the service processing module 2; after performing tunnel encapsulation for the forward flow, the service processing module 2 transmits a tunnel packet generated after the tunnel encapsulation through the interface module 2. Correspondingly, after receiving a returned reverse stream tunnel packet, the interface module 2 transmits the reverse stream tunnel packet to the service processing module 2 corresponding to the interface module 2; the service processing module 2 performs processing, e.g. decapsulation for the reverse stream tunnel packet, and transmits the packet after the decapsulation to the service processing module 1; and then the service processing module 1 performs service processing for the packet and transmits the packet through the interface module 1 corresponding to the service processing module 1. In practical applications, the service processing module 1 and the service processing module 2 may perform partial service processing for the packet separately, which will not be described here in detail.

Because the service processing module corresponding to the interface module receiving the packet from the outside of the network device and the service processing module performing the tunnel processing may be two different service processing modules, if it is needed to perform tunnel processing for a session packet, the same session packet will be processed by different service processing modules. In this way, in order to guarantee that a session proceeds normally, it is not only needed to store session states in different service processing modules processing the same session packet, but also needed to perform synchronization between different service processing modules, which greatly increases complexity of processing the packet by the network device, consumes system bandwidth, and is not beneficial to perform the service processing for the packet by the network device.

SUMMARY OF THE INVENTION

In view of the above, the first object of the present invention is to provide an apparatus for processing a packet, which can implement burden equalization of service processing, decrease complexity of processing a packet by a network device, and save system bandwidth.

The second object of the present invention is to provide a method for processing a packet, which can implement burden equalization of service processing, decrease complexity of processing a packet by a network device, and save system bandwidth.

To achieve the above objects, the technical schemes of the present invention are as follows.

An apparatus for processing a packet includes multiple interface processing modules and multiple service processing modules, any one of the multiple interface processing modules being connected with any one of the multiple service processing modules through a connection module; and the interface processing module is adapted to receive a packet from the outside of the apparatus; if the packet is an initial packet of a session, select one service processing module from the multiple service processing modules, and transmit the packet to the service processing module selected through the connection module; if the packet is not an initial packet of a session, transmit the packet to a service processing module determined; and the service processing module is adapted to perform service processing for the received packet, if the service processing module needs to perform tunnel processing for the packet, transmit the packet through the connection module and the interface processing module after performing tunnel processing for the packet, if another service processing module needs to perform tunnel processing for the packet, transmit the received packet which service processing is not performed for to a service processing module needing to perform tunnel processing for the packet.

A method for processing a packet includes:

determining, by an interface processing module, whether a received packet is an initial packet of a session;

if the received packet is the initial packet of the session, selecting, by the interface processing module, one service processing module from all service processing modules according to a preset selecting policy, and transmitting the received packet to the service processing module selected; and if the received packet is not the initial packet of the session, performing, by a service processing module, service processing for the received packet, determining whether the service processing module needs to perform tunnel processing for the packet; if the service processing module needs to perform tunnel processing for the packet, transmitting the packet after performing the tunnel processing for the packet; otherwise, transmitting the received packet which service processing is not performed for to a service processing module needing to perform tunnel processing for the packet, and transmitting, by the service processing module needing to perform tunnel processing for the packet, the packet after performing the service processing and the tunnel processing.

In view of the foregoing, the present invention provides an apparatus and method for processing a packet. After a service processing module receives a packet, if another service processing module needs to perform tunnel processing for the packet, the service processing module may transmit the received packet to the another service processing module needing to perform the tunnel processing for the packet, so as to guarantee that the same service processing module processes the packet uniformly. In this way, it is unnecessary to store session states in the service processing module performing the tunnel processing for the packet and other service processing modules, and it is also unnecessary to perform synchronization between the service processing module performing the tunnel processing and other service processing modules, which greatly decreases complexity of processing the packet and saves system bandwidth.

DETAILED DESCRIPTION OF THE INVENTION

In order to make the object, the technical scheme and merits of the present invention clearer, the present invention will be described hereinafter in detail with reference to accompanying drawings and embodiments.

Figure 2:
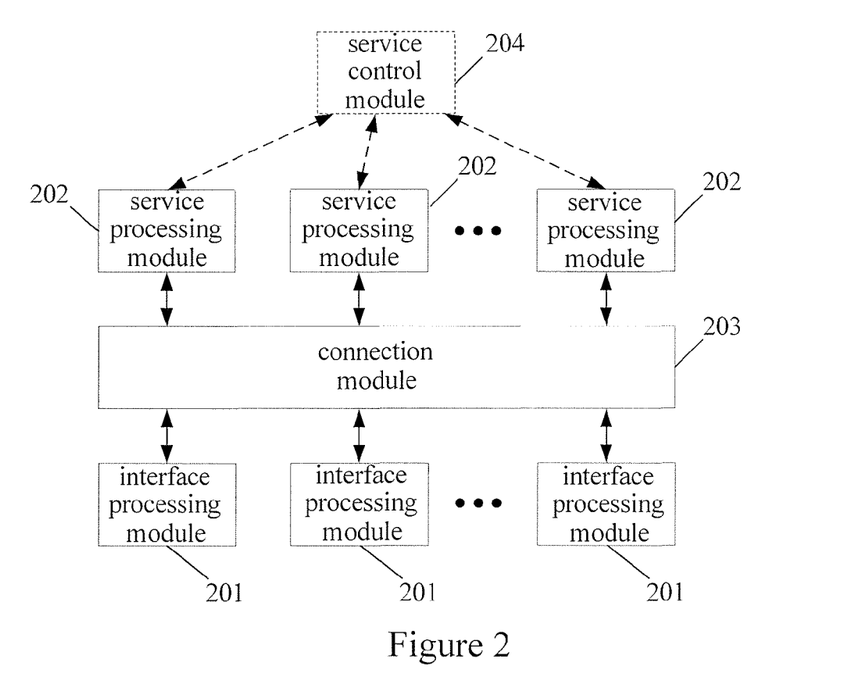
FIG. 2 is a schematic diagram illustrating an internal structure of an apparatus for processing a packet in accordance with an embodiment of the present invention.

FIG. 2 is a schematic diagram illustrating an internal structure of an apparatus for processing a packet in accordance with an embodiment of the present invention. As shown in FIG. 2, the apparatus includes:

Multiple interface processing modules 201 and multiple service processing modules 202; any one interface processing module 201 is connected with any one service processing module 202 through a connection module 203.

The interface processing module 201 is adapted to receive a packet from outside of the apparatus; if the packet is an initial packet of a session, select one service processing module from all service processing modules 202 and transmit the packet to the selected service processing module 202 through the connection module 203; if the packet is not an initial packet of a session, transmit the packet to a determined service processing module 202.

The service processing module 202 is adapted to perform service processing for the received packet; if the service processing module 202 needs to perform tunnel processing for the packet, transmit the packet through the connection module 203 and the interface processing module 201 after performing the tunnel processing for the packet; if the service processing module 202 does not need to perform the tunnel processing for the packet, transmit the received packet which service processing is not performed for to a service processing module 202 needing to perform the tunnel processing for the packet through the connection module 203.

Here, any one interface processing module 201 may be connected with any one service processing module 202 through the connection module 203, so when a certain interface processing module 201 receives an initial packet of a session, the interface processing module 201 may select one service processing module from all service processing modules 202, i.e. the interface processing modules 201 are not bound with the service processing modules 202 one by one any more. The procedure of the interface processing module 201 selecting one service processing module from all service processing modules 202 can be implemented according to a preset selecting policy. The selecting policy may be a randomly selecting policy, an alternatively selecting policy, etc.

After receiving the initial packet sent by the interface processing module 201, the service processing module 202 provided by the present invention performs general service processing for the packet, further performs tunnel processing for the packet when needing to perform the tunnel processing for the packet, and transmits the packet through the connection module 203 and the interface processing module 201 after performing the tunnel processing; when another service processing module needs to perform tunnel processing for the packet, the service processing module 202 transmits the received packet which service processing is not performed for to the another service processing module 202 needing to perform the tunnel processing for the packet. Here, whether the service processing module 202 receiving the packet needs to perform tunnel processing for the packet and which service processing module 202 should perform tunnel processing for the packet can be determined during service processing or after tunnel processing, which will be described hereinafter in detail when an internal structure of the service processing module 202 is described.

That is to say, there are two cases when the service processing module 202 receives the initial packet.

The first case is that the service processing module 202 receiving the initial packet needs to perform tunnel processing for the packet, i.e. the selected service processing module and the service processing module needing to perform tunnel processing for the packet are the same module. In this case, the service processing and tunnel processing are performed for the packet by the selected service processing module 202.

The second case is that the service processing module 202 receiving the initial packet does not need to perform tunnel processing for the packet, but another service processing module 202 needs to perform tunnel processing for the packet, i.e. the selected service processing module and the service processing module needing to perform tunnel processing for the packet are different modules. In this case, the selected service processing module 202 needs to perform redirection, i.e. the initial packet is transmitted to the service processing module 202 needing to perform tunnel processing for the packet, and this service processing module 202 performs the service processing and tunnel processing for the initial packet.

Regardless of which case, after the tunnel processing is performed for the initial packet of the session, a service processing module processing subsequent packets is determined, i.e. the subsequent packets of the session are all directly transmitted to the service processing module needing to perform the tunnel processing for the packets.

In practical applications, the apparatus for processing the packet further includes: a service control module 204 connected with the service processing modules 202. In this case, the service processing module 202 is further adapted to determine whether the packet is an initial packet of the session when receiving the packet; if the packet is the initial packet of the session, transmit the packet to the service control module 204, and transmit obtained session forwarding information to all interface processing modules 201 after determining that the service processing module 202 needs to perform tunnel processing for the packet. The service control module 204 is adapted to generate the session forwarding information according to the initial packet of the session, and transmit the generated session forwarding information to the service processing module 202. The session forwarding information includes a service processing module identity (ID). Here, the determined service processing module is a service processing module corresponding to the service processing module ID in the session forwarding information stored by the interface processing module 201.

There may be one or more than one service control module 204, and the service control module 204 may be connected with the service processing modules 202 in multiple modes. For example, all service processing modules 202 are connected with the same service control module through another connection module; or, each service processing module 202 is directly connected with a service control module corresponding to the service processing module 202; or, any one service processing module 202 is connected with any one service control module through a connection module.

Figure 3:
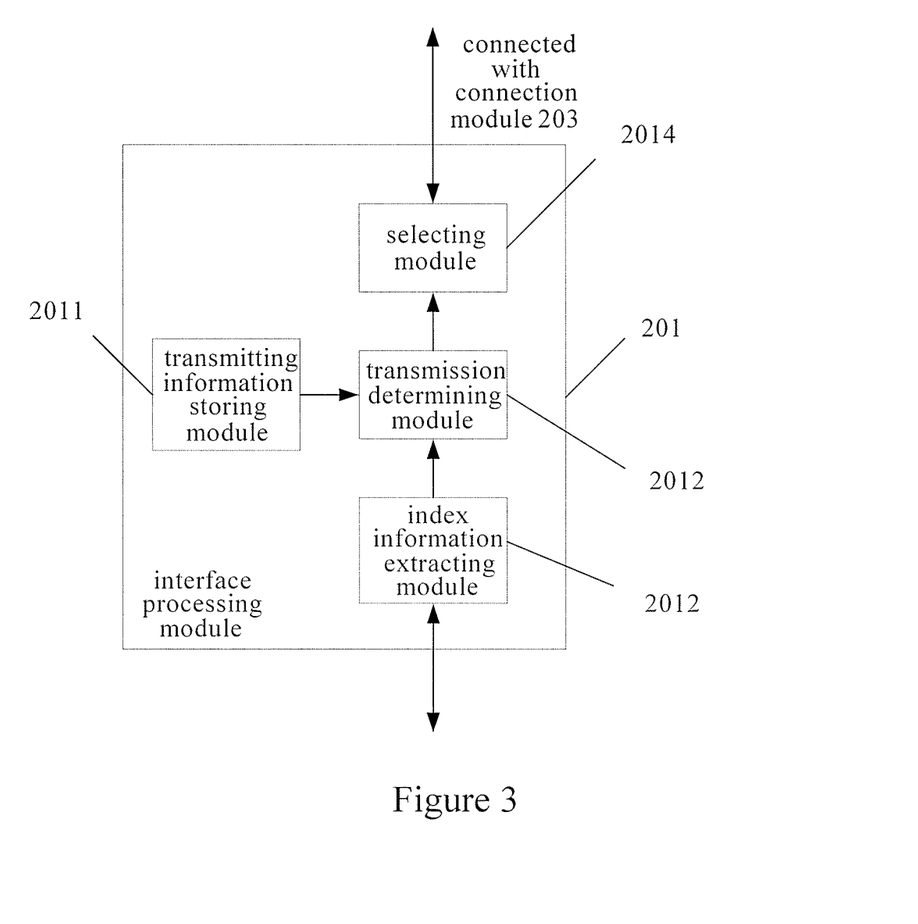
FIG. 3 is a schematic diagram illustrating an internal structure of an interface processing module in an apparatus in accordance with an embodiment of the present invention.

No matter how many service control modules 204 are included in the apparatus and how the service control module 204 is connected with the service processing modules 202, a schematic diagram illustrating an internal structure of the interface processing module 201 in accordance with an embodiment of the present invention is shown in FIG. 3. The internal structure of the interface processing module 201 includes the following modules.

A transmitting information storing module 2011 is adapted to store session forwarding information.

An index information extracting module 2012 is adapted to receive a packet from outside of the apparatus and extract quintuple information of the packet.

A transmission determining module 2013 is adapted to determine whether the transmitting information storing module 2011 stores session forwarding information corresponding to the packet according to the quintuple information of the packet extracted by the index information extracting module 2012; if the transmitting information storing module 2011 stores the session forwarding information corresponding to the packet, determine the received packet is not an initial packet of the session, and transmit the received packet to a service processing module 202 corresponding to a service processing module ID in the session forwarding information; if the transmitting information storing module 2011 does not store the session forwarding information corresponding to the packet, determine the received packet is an initial packet of the session, and trigger a selecting module 2014 to select one service processing module.

The selecting module 214 is adapted to select one service processing module from all service processing modules 202 according to a preset selecting policy, and transmit the received packet to the selected service processing module 202 through the connection module 203. The selecting policy may be a randomly selecting policy, an alternatively selecting policy, etc.

The above mentioned is the internal structure of the interface processing module 201. In practical applications, after the interface processing module 201 receives the initial packet and transmits the initial packet to the service processing module selected according to the selecting policy, the service processing module 202 needs to transmit the initial packet to the service control module 204; the service control module 204 generates session control information according to the initial packet and transmits the generated session control information to the service processing module 202. Hereafter, the service processing module 202 performs service processing for the packet according to the obtained session control information.

Figure 4A:
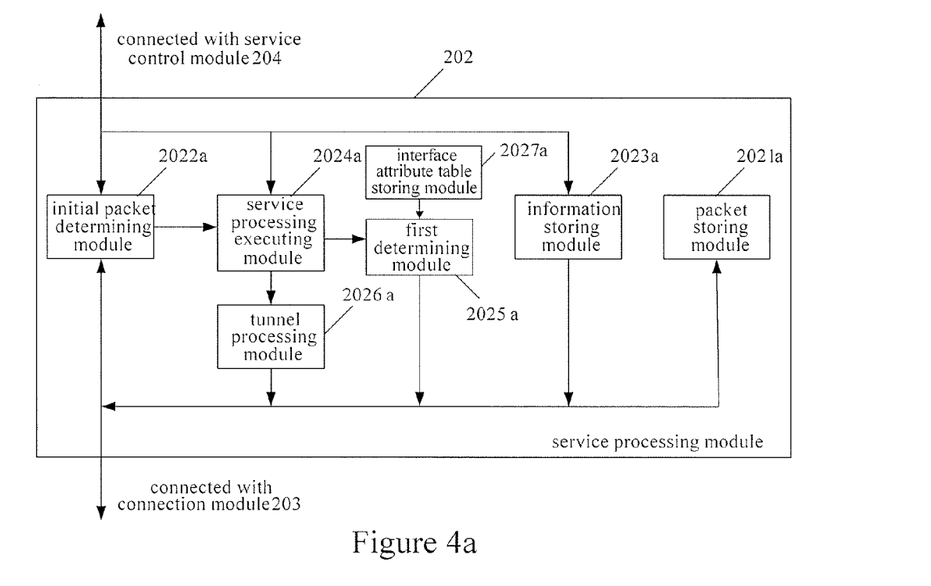
FIG. 4a is a schematic diagram illustrating an internal structure of a service processing module in an apparatus in accordance with a first embodiment of the present invention.

No matter how many service control modules are included in the apparatus and how the service control module is connected with the service processing modules 202, a schematic diagram illustrating an internal structure of the interface processing module 201 in accordance with an embodiment of the present invention is shown in FIG. 4a. The internal structure of the interface processing module 201 includes the following modules.

A packet storing module 2021a is adapted to store a packet which is from the interface processing module 201 and service processing is not performed for.

An initial packet determining module 2022a is adapted to determine whether the received packet is an initial packet of a session; if the received packet is an initial packet, transmit the packet to the service control module 204; if the received packet is not an initial packet, transmit the packet to a service processing executing module 2024a. Here, methods for determining whether the received packet is an initial packet of the session may be different according to different packets. For example, if the received packet is a TCP packet, the method may include: determining whether the packet contains an initial packet flag; if the packet contains an initial packet flag, the packet is an initial packet of the session. For another example, if the received packet is a UDP packet, the method may include: querying an existing session table according to quintuple information of the packet, if there is no session item corresponding to the quintuple information, the packet is an initial packet of the session.

An information storing module 2023a is adapted to store session control information and session forwarding information returned by the service control module 204, and transmit the obtained session forwarding information to all interface processing modules 202 when determining that the service processing module which the information storing module 2023a belongs to needs to perform tunnel processing.

The service processing executing module 2024a is adapted to perform service processing for the received packet according to the session control information.

A first determining module 2025a is adapted to query an interface attribute table storing module 2027a according to an egress obtained by the service processing executing module 2024a performing the service processing for the packet, determine a service processing module ID corresponding to the egress, and determine whether the service processing module which the first determining module 2025a belongs to needs to perform tunnel processing according to the obtained the service processing module ID; if the service processing module which the first determining module 2025a belongs to needs to perform the tunnel processing, transmit the packet which service processing is performed for to a tunnel processing module 2026a; otherwise, transmit the packet which service processing is not performed for and is stored in the packet storing module 2021a to the service processing module needing to perform tunnel processing for the packet.

If the service processing module ID corresponding to the egress is the same as the ID of the service processing module which the first determining module 2025a belongs to, the first determining module 2025a may determine that the service processing module which the first determining module 2025a belongs to needs to perform the tunnel processing for the packet; otherwise, the first determining module 2025a may determine that the service processing module which the first determining module 2025a belongs to does not need to perform the tunnel processing for the packet, but a service processing module corresponding to the service processing module ID needs to perform tunnel processing.

The tunnel processing module 2026a is adapted to perform tunnel processing for the packet, and transmit the packet through the connection module 203 and the interface processing module 201.

The interface attribute table storing module 2027a is adapted to store a relation between egresses and service processing module IDs.

That is to say, when receiving the packet, the service processing module 202 stores the received packet which service processing is not performed for in the packet storing module 2021a. The initial packet determining module 2022a determines whether the received packet is the initial packet of the session; if the received packet is the initial packet of the session, the initial packet determining module 2022a transmits the packet to the service control module 204; if the received packet is not the initial packet of the session, the initial packet determining module 2022a transmits the packet to the service processing executing module 2024a. Here, no matter whether the received packet is the initial packet, when performing service processing for the packet, the session control information may be obtained from the information storing module 2023a. The service processing executing module 2024a performs the service processing for the received packet according to the session control information, and obtains the egress by querying a transmitting table during the service processing. The first determining module 2025a queries the interface attribute table storing module 2027a according to the obtained egress, determines the service processing module ID corresponding to the egress, and determines whether the service processing module which the first determining module 2025a belongs to needs to perform the tunnel processing; if the service processing module which the first determining module 2025a belongs to needs to perform the tunnel processing, the first determining module 2025a transmits the packet which service processing is performed for to the tunnel processing module 2026a, and the tunnel processing module 2026a performs the tunnel processing; otherwise, the first determining module 2025a transmits the packet which service processing is not performed for and is stored in the packet storing module 2021a to the service processing module needing to perform the tunnel processing for the packet. If a certain service processing module 202 does not need to perform tunnel processing for the packet and another service processing module needs to perform tunnel processing for the packet, the session control information and the session forwarding information stored in the information storing module 2023a may be deleted.

Figure 4B:
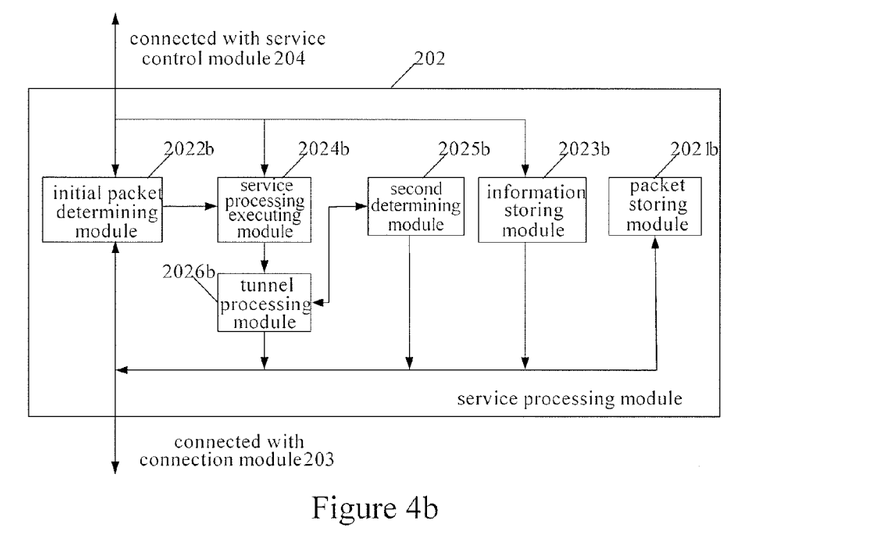
FIG. 4b is a schematic diagram illustrating an internal structure of a service processing module in an apparatus in accordance with a second embodiment of the present invention.

In practical applications, a schematic diagram illustrating the internal structure of the service processing module 202 is shown in FIG. 4b. The internal structure of the service processing module 202 includes the following modules.

A packet storing module 2021b is adapted to store a packet from the interface processing module 201.

An initial packet determining module 2022b is adapted to determine whether the received packet is an initial packet of a session; if the received packet is an initial packet, transmit the packet to the service control module 204; if the received packet is not an initial packet, transmit the packet to a service processing executing module 2024b. Here, method for determining whether the received packet is an initial packet is the same as the method executed by the initial packet determining module 2022a in FIG. 4a, and will not be described.

An information storing module 2023b is adapted to store session control information and session forwarding information returned by the service control module 204, and transmit the obtained session forwarding information to all interface processing modules 202 when determining that the service processing module which the information storing module 2023b belongs to needs to perform tunnel processing.

The service processing executing module 2024b is adapted to perform service processing for the received packet according to the session control information.

A second determining module 2025b is adapted to determine whether the service processing module which the second determining module 2025b belongs to needs to perform tunnel processing according to a result of the tunnel processing; if the service processing module which the second determining module 2025b belongs to needs to perform tunnel processing, transmit the packet which the tunnel processing is performed for through the connection module 203 and the interface processing module 201; otherwise, transmit the packet stored in the packet storing module 2021b to a service processing module needing to perform tunnel processing for the packet.

A tunnel processing module 2026b is adapted to perform the tunnel processing for the packet.

In practical applications, after the tunnel processing module 2026b performs the tunnel processing for the packet, a service processing module ID corresponding to a service processing module needing to perform the tunnel processing can be determined. How to determine the service processing module ID after the tunnel processing is a conventional technology, and will not be described here.

That is to say, when receiving the packet, the service processing module 202 stores the received packet which service processing is not performed for in the packet storing module 2021b. The initial packet determining module 2022b determines whether the received packet is the initial packet of the session; if the received packet is the initial packet of the session, the initial packet determining module 2022b transmits the packet to the service control module 204; if the received packet is not the initial packet of the session, the initial packet determining module 2022b transmits the packet to the service processing executing module 2024b. If the received packet is the initial packet of the session, the service control module 204 returns session control information and session forwarding information, and the session control information and the session forwarding information are stored in the information storing module 2023b of the service processing module 202; if the received packet is not the initial packet of the session, it is determined that the service control module 204 has returned the session control information and the session forwarding information, and the session control information and the session forwarding information are stored in the information storing module 2023b of the service processing module 202. To sum up, no matter whether the received packet is the initial packet, when performing the service processing for the packet, the service processing executing module 2024b can obtain the session control information from the information storing module 2023b, and perform the service processing for the packet according to the session control information. And then, the tunnel processing module 2026b performs the tunnel processing for the packet which service processing is performed for. The second determining module 2025b determines whether the service processing module which the second determining module 2025b belongs to needs to perform the tunnel processing according to the service processing module ID obtained after the tunnel processing; if the service processing module which the second determining module 2025b belongs to needs to perform tunnel processing, the second determining module 2025b transmits the packet which the tunnel processing is performed for through the connection module 203 and the interface processing module 201; otherwise, the second determining module 2025b transmits the packet which service processing and tunnel processing are not performed for and is stored in the packet storing module 2021b to the service processing module needing to perform tunnel processing for the packet, i.e. transmits to a service processing module corresponding to the service processing module ID obtained after the tunnel processing. similarly to the service processing module in FIG. 4a, if a certain service processing module 202 does not need to perform tunnel processing for the packet and another service processing module 202 needs to perform tunnel processing for the packet, the session control information and the session forwarding information stored in the information storing module 2023b may be deleted.

Here, differences between the service processing modules 202 shown in FIG. 4b and FIG. 4a includes that the first determining module 2025a determines the service processing module ID according to the egress obtained during the service processing, while the second determining module 2025b determines the service processing module ID after the tunnel processing is performed for the packet. If the structure of FIG. 4a is adopted, it is needed to record the relation between the egresses and the service processing module IDs in the interface attribute table in advance. After the service processing is performed for the packet, it can be determined that the service processing module needs to perform tunnel processing for the packet by directly querying the interface attribute table according to the obtained egress. If the structure of FIG. 4b is adopted, no matter whether the service processing module needs to perform tunnel processing for the packet, the service processing module may perform the tunnel processing firstly, and obtain the service processing module ID after the tunnel processing. If the service processing module determines that the service processing module needs to perform tunnel processing for the packet itself according to the obtained service processing module ID, the service processing module directly transmits the packet which the tunnel processing is performed for; if the service processing module determines that the service processing module does not need to perform tunnel processing for the packet itself, the service processing module transmits the packet to corresponding service processing module.

The above mentioned is a case that the interface processing module 201 receives a forward flow. In practical applications, because the session is usually bidirectional, the interface processing module 201 may receive a reverse flow. In this case, the interface processing module 201 is further adapted to receive a reverse flow from the outside of the apparatus, and transmit the reverse flow to a determined service processing module through the connection module 203. The service processing module is further adapted to perform tunnel processing and service processing for the received reverse flow, and transmit the reverse flow through the connection module 203 and the interface processing module 201.

The apparatus of the present invention may be an L4~L7 network device, e.g. a firewall, the connection module may be a switch fabric in the network device, the service processing module may be a service processing module in a service board in the network device, and the interface processing module may be an interface processing module in the service board or a master control board in the network device.

Figure 5:
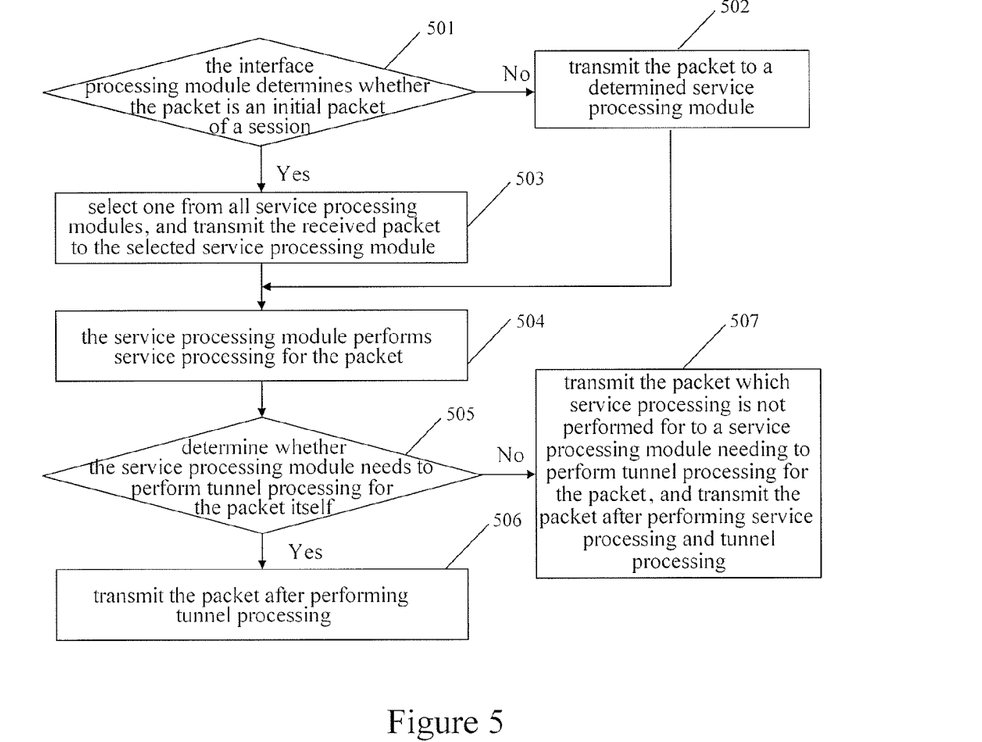
FIG. 5 is a flowchart illustrating a method for processing a packet by an apparatus in accordance with an embodiment of the present invention.

According to the above apparatus for processing a packet, the present invention also provides a method for processing a packet. FIG. 5 is a flowchart illustrating a method for processing a packet in accordance with an embodiment of the present invention. As shown in FIG. 5, the method includes the following steps.

Steps 501-502: An interface processing module determines whether a received packet is an initial packet of a session; if the received packet is the initial packet, Step 503 is performed; otherwise, the interface processing module transmits the packet to a determined service processing module, and Step 504 is performed.

In this step, the packet received by the interface processing module includes two cases.

One case is that the packet is the initial packet of the session and the other case is that the packet is not the initial packet of the session. If the packet is the initial packet of the session, the interface processing module receives the packet of the session for the first time, does not know which service processing module should process the packet, and needs to select one service processing module from all service processing modules according to Step 503. If the packet is not the initial packet of the session, the interface processing module has received other packets of the same session before, the packet should be performed by the same service processing module, i.e. should be performed by the determined service processing module.

Step 503: The interface processing module selects one service processing module from all service processing modules according to a selecting policy, and transmits the received packet to the selected service processing module.

The selecting policy may be determined by a user applying the technical scheme of the present invention, e.g. a randomly selecting policy, an alternatively selecting policy, etc. The randomly selecting policy refers to that the interface processing module randomly selects one service processing module from all service processing modules, and the alternatively selecting module refers to that the interface processing module selects one service processing module from all service processing modules in a preset order. For example, the module currently processing a certain session is a service processing module 4, if the interface processing module receives an initial packet of another session, the interface processing module transmits the initial packet of the another session to a service processing module 5.

Step 504: A service processing module performs service processing for the received packet.

In practical applications, the service processing module may perform the service processing for the received packet according to obtained session control information. The method for obtaining the session control information includes:

When receiving the packet, the service processing module determines whether the received packet is an initial packet of a session; if the received packet is the initial packet of the session, the service processing module transmits the received packet to the service control module, and receives the session control information generated and returned by the service control module.

Here, methods for determining whether the received packet is the initial packet of the session by the service processing module may be different according to different packets. For example, the service processing module determines whether the packet contains an initial packet flag; if the packet contains an initial packet flag, the packet is the initial packet of the session. This method is suitable for a case that the initial packet contains the initial packet flag, e.g. a TCP packet and the like. For another example, the service processing module queries an existing session table according to quintuple information in the packet; if there is no session item corresponding to the quintuple information, the packet is the initial packet of the session. This method is suitable for a case that the initial packet does not contain an initial packet flag, e.g. a UDP packet and the like.

In practical applications, when receiving a packet from the service processing module, the service control module may generate session forwarding information according to the received packet, and returns the generated session forwarding information to the service processing module. The session forwarding information includes quintuple information of the packet and a service processing module ID.

Steps 505-507: The service processing module determines whether the service processing module needs to perform tunnel processing for the packet itself; if the service processing module needs to perform tunnel processing for the packet, the service processing module transmits the packet after performing the tunnel processing; otherwise, the service processing module transmits the received packet which service processing is not performed for to a service processing module needing to perform tunnel processing for the packet, and the service processing module needing to perform tunnel processing for the packet transmits the packet after performing the service processing and the tunnel processing.

The service processing module receiving the packet may be the selected service processing module for processing the initial packet in Step 503, and may also be the service processing module for processing a non-initial packet determined in Step 501. Regardless of which packet, the received packet should be performed uniformly by the service processing module in Steps 504-507.

Here, there are two methods for the service processing module determining whether the service processing module needs to perform the tunnel processing itself.

In the first method, the service processing module queries an interface attribute table stored in advance according to an egress obtained by performing the service processing for the packet, obtains a service processing module ID. The interface attribute table includes relation between the egresses and the service processing module IDs; if the obtained service processing module ID is the same as the ID of the service processing module, the service processing module determines that the service processing module needs to perform tunnel processing for the packet itself; otherwise, the service processing module does not need to perform tunnel processing for the packet.

In the second method, the service processing module performs tunnel processing for the packet which service processing is performed for, obtains a service processing module ID after the tunnel processing; if the obtained service processing module ID is the same as the ID of the service processing module, the service processing module determines that the service processing module needs to perform tunnel processing for the packet itself; otherwise, the service processing module does not need to perform tunnel processing for the packet.

In the first method the determining is performed after the service processing. If the service processing module determines that the service processing module needs to perform the tunnel processing for the packet itself, the service processing module further needs to perform the tunnel processing, and transmits the packet after the tunnel processing. In the second method, the determining is performed after the tunnel processing. If the service processing module determines that the service processing module needs to perform the tunnel processing for the packet itself, the service processing module directly transmits the packet which the tunnel processing is performed for.

In the present invention, the interface processing module and the service processing module are separated and are not bounded together. In order that the service processing module may proceed with processing subsequent packets of the initial packet after processing the initial packet, the service processing module may transmit the obtained session forwarding information to all interface processing modules after determining that the service processing module needs to perform the tunnel processing for the packet itself. Hereafter, no matter which interface processing module receives other subsequent packets of the same session, the packet can be transmitted to the determined service processing module according to the stored session forwarding information, i.e. to a service processing module corresponding to the service processing module ID in the session forwarding information. Here, the session forwarding information can be issued when the session control module returns the session control information to the service processing module. Because data stream of a session can be identified uniquely by quintuple information of the packet of the session, the session forwarding information may contain the quintuple information of the packet and the service processing module ID. When receiving the packet, the interface processing module may transmit the packet to a service processing module according to the quintuple information.

It should be noted that, different from that an interface module in the prior art directly transmits a received packet to a service processing module fixedly connected with the interface module, the interface processing module in the present invention transmits the received packet according to the session forwarding information, and the service processing module corresponding to the service processing module ID in the session forwarding information is the service processing module which determines to perform tunnel processing for the packet after receiving the initial packet. That is to say, the initial packet of the session and the subsequent packets are processed by the service processing module needing to perform tunnel processing for the packets, and do not need to be processed by different service processing modules. Therefore, other service processing modules do not need to store session states, and the service processing module needing to perform tunnel processing for the packet does not need to perform synchronization with other service processing modules, which greatly decreases the complexity of processing the packet by the apparatus and saves the system bandwidth.

In order to make the technical scheme of the present invention clearer, an embodiment is described hereinafter in detail.

Figure 6:
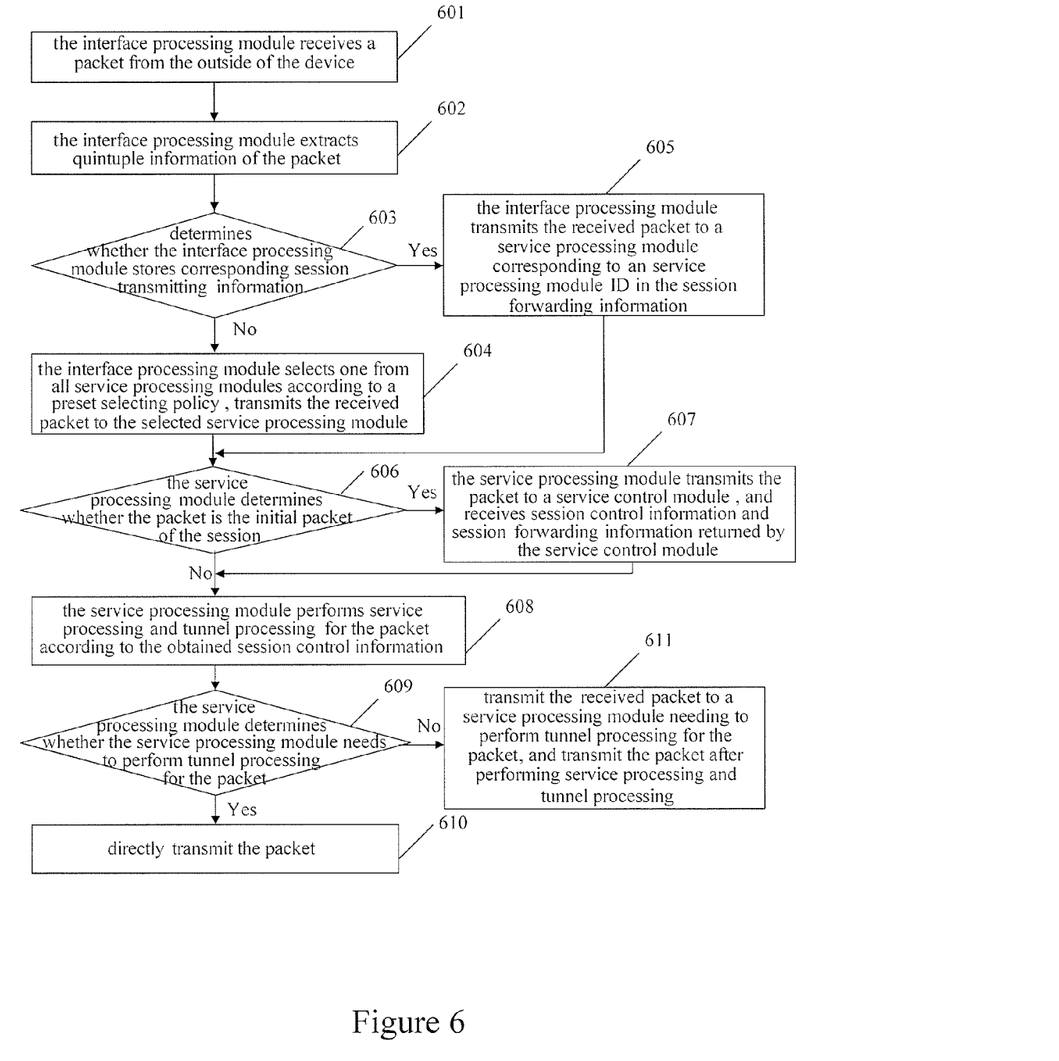
FIG. 6 is a flowchart illustrating a method for processing a packet by an apparatus in accordance with a first embodiment of the present invention.

In this embodiment, it is supposed that an apparatus processing a packet is a firewall network device, e.g. an L4~L7 network device, packets of a session are TCP packets, and an initial packet of the session contains an initial packet flag. In addition, it is supposed that the service processing module in this embodiment determines whether the service processing module needs to perform tunnel processing for the packet itself after the tunnel processing. FIG. 6 is a flowchart according to this embodiment. As shown in FIG. 6, this embodiment includes the following steps.

Step 601: An interface processing module receives a packet from outside of the apparatus.

Step 602: The interface processing module extracts quintuple information of the packet.

Step 603: The interface processing module determines whether the interface processing module stores session forwarding information corresponding to the quintuple information according to the extracted quintuple information of the packet; if the interface processing module does not store the session forwarding information corresponding to the quintuple information, the interface processing module determines that the received packet is an initial packet of a session, and Step 604 is performed; otherwise, the interface processing module determines that the received packet is not the initial packet of the session, and Step 605 is performed.

Step 604: The interface processing module selects one service processing module from all service processing modules according to a preset selecting policy, transmits the received packet to the selected service processing module, and Step 606 is performed.

The selecting policy may be a randomly selecting policy, an alternatively selecting policy, etc.

Step 605: The interface processing module transmits the received packet to a service processing module corresponding to a service processing module ID in the session forwarding information.

Step 606: The service processing module determines whether the received packet is an initial packet of a session according to an initial packet flag of the packet; if the received packet is the initial packet of the session, Step 607 is performed; otherwise, Step 608 is performed.

Step 607: The service processing module transmits the packet to a service control module, and receives session control information and session forwarding information returned by the service control module.

Step 608: The service processing module performs service processing and tunnel processing for the packet according to the obtained session control information in step 607 or existing session control information if step 608 is performed after step 606.

Steps 609-611: The service processing module determines whether the service processing module needs to perform tunnel processing for the packet according to a service processing module ID obtained after the tunnel processing; if the service processing module needs to perform tunnel processing for the packet, the service processing module transmits the packet directly; otherwise, the service processing module transmits the packet which service processing is not performed for to a service processing module corresponding to the obtained service processing module ID, and the service processing module corresponding to the obtained service processing module ID performs service processing and tunnel processing for the packet and then transmits the packet.

Here, the service processing module determines whether the service processing module needs to perform tunnel processing for the packet itself according to the service processing module ID obtained after the tunnel processing. In practical applications, the service processing module may also determine whether the service processing module needs to perform tunnel processing for the packet itself by querying an interface attribute table according to an egress obtained during the service processing, the specific case may refer to the above description for the service processing module 202, and will not be further described.

If the service processing module determines that the service processing module needs to perform tunnel processing for the packet itself, the service processing module may transmit the obtained session forwarding information to all interface processing modules, so that the interface processing modules directly transmit the subsequent packets to the service processing module according to the session forwarding information after receiving the subsequent packets.

If the service processing module determines that the service processing module does not need to perform tunnel processing for the packet itself, but another service processing module needs to perform tunnel processing for the packet, the service processing module transmits the packet which service processing is not performed for to the service processing module needing to perform tunnel processing for the packet, i.e. a service processing module corresponding to the service processing module ID obtained after the tunnel processing. After receiving the packet, the service processing module needing to perform tunnel processing for packet performs service processing and tunnel processing for the packet. In order that all service processing modules processes the packet uniformly, the service processing module needing to perform tunnel processing for the packet performs the processing procedure which is the same as Steps 606-611, and transmits the obtained session forwarding information to all interface processing modules.

The above mentioned is a case that a forward flow is received, and if a reverse flow of a session is received, because all interface processing modules store the session forwarding information of the session, the interface processing module may directly transmit the packet to a service processing module needing to perform tunnel processing for the packet according to the session forwarding information, and the service processing module performs tunnel processing and service processing for the packet, and transmits the packet after the tunnel processing.

In the technical scheme of this embodiment, when the service processing module receives the packet, if the service processing module does not need to perform tunnel processing for the packet, but another service processing module needs to perform tunnel processing for the packet, the service processing module may transmit the received packet to the service processing module needing to perform tunnel processing for the packet, to guarantee that the packet is processed uniformly, so that it is unnecessary to store the session states in the service processing module performing tunnel processing for the packet and other service processing modules, and also unnecessary to perform synchronization between the service processing module performing tunnel processing for the packet and other service processing modules, which greatly decreases the complexity of processing the packet and saves the system bandwidth.

The foregoing descriptions are only preferred embodiments of the present invention and are not for use in limiting the protection scope thereof. Any modification, equivalent replacement and improvement made under the spirit and principle of the present invention should be included in the protection scope thereof.

What is claimed is:

1. An apparatus for processing a packet, comprising:
a connection module which is a switch fabric in a network device,
multiple interface processing modules implemented on a service board or a master control board in the network device, and
multiple service processing modules implemented on the service board in the network device,
a service control module implemented on the master control board in the network device and connected with the multiple service processing modules,
any one of the multiple interface processing modules being connected with any one of the multiple service processing modules through the connection module;
wherein
one interface processing module is adapted to receive a first packet from the outside of the apparatus;
if the first packet is an initial packet of a session, select one of the multiple service processing modules from the multiple service processing modules, and transmit the first packet through the connection module to the service processing module selected; and
one service processing module is adapted to determine whether a second packet is an initial packet of a second session;
if the second packet is the initial packet of the second session, transmit the second packet to the service control module and transmit session forwarding information transmitted by the service control module to the multiple interface processing modules upon determining that the one service processing module needs to perform tunnel processing for the second packet;
store the second packet;
perform service processing for the second packet;
if the one service processing module needs to perform the tunnel processing for the second packet, transmit the second packet after performing the tunnel processing for the second packet,
if another service processing module needs to perform the tunnel processing for the second packet, transmit the second packet stored to the another service processing module needing to perform the tunnel processing for the second packet;
the service control module is adapted to generate session forwarding information according to the initial packet of the session, and transmit the generated session forwarding information to the service processing module sending the initial packet of the session;
the session forwarding information comprises a service processing module identity (ID);
the one interface processing module is further adapted to if the first packet is not an initial packet of a session, transmit the first packet to a service processing module determined,
the service processing module determined is a service processing module corresponding to one service processing module ID in one session forwarding information stored by the one interface processing module.

2. The apparatus of claim 1, wherein the session forwarding information further comprises quintuple information and the one interface processing module comprises:
a transmitting information storing module, adapted to store session forwarding information;
an index information extracting module, adapted to receive the first packet from the outside of the apparatus and extract quintuple information of the first packet;
a transmission determining module, adapted to determine whether the transmitting information storing module stores session forwarding information corresponding to the quintuple information of the first packet extracted by the index information extracting module;
if the transmitting information storing module stores the session forwarding information corresponding to the quintuple information of the first packet extracted by the index information extracting module, determine that the first packet is not the initial packet of the session, and transmit the first packet to the service processing module determined;
the service processing module determined corresponding to the one service processing module ID in the one session forwarding information corresponding to the quintuple information of the first packet extracted by the index information extracting module;
if the transmitting information storing module does not store the one session forwarding information corresponding to the quintuple information of the first packet extracted by the index information extracting module, determine that the first packet is the initial packet of the session, and trigger a selecting module to select a service processing module; and
the selecting module, adapted to select the service processing module from the multiple service processing modules according to a preset selecting policy, and transmit the first packet through the connection module to the service processing module selected.

3. The apparatus of claim 1, wherein the service control module is further adapted to generate session control information according to an initial packet, and transmit the session control information generated to the service processing module sending the initial packet; and
the service processing performed by the service processing module comprises:
service processing performed for the second packet according to the session control information.

4. The apparatus of claim 3, wherein the one service processing module comprises:
a packet storing module, adapted to store the second packet;
an initial packet determining module, adapted to determine whether the second packet is the initial packet of the second session;
if the second packet is the initial packet of the second session, transmit the second packet to the service control module;
if the second packet is not the initial packet of the second session, transmit the second packet to a service processing executing module;
an information storing module, adapted to store the session control information transmitted by the service control module and the session forwarding information transmitted by the service control module, and transmit the session forwarding information transmitted by the service control module to the multiple interface processing modules after determining that the service processing module which the information storing module belongs to needs to perform the tunnel processing for the second packet;

the service processing executing module, adapted to perform the service processing for the second packet according to the session control information transmitted by the service control module;

a first determining module, adapted to
query, according to an egress obtained by performing the service processing for the second packet, an interface attribute table storing module;
determine a service processing module ID corresponding to the egress,
determine, according to the service processing module ID obtained, whether the one service processing module which the first determining module belongs to needs to perform the tunnel processing;
if the one service processing module which the first determining module belongs to needs to perform the tunnel processing, transmit the second packet stored in the packet storing module to a tunnel processing module;
otherwise, transmit the second packet stored in the packet storing module to the another service processing module needing to perform the tunnel processing for the second packet;
the interface attribute table storing module, adapted to store a one to one relation between egresses and service processing module IDs; and
the tunnel processing module, adapted to perform the tunnel processing for the second packet transmitted by the first determining module, and transmit the second packet.

5. The apparatus of claim 3, wherein the one service processing module comprises:
a packet storing module, adapted to store the second packet;
an initial packet determining module, adapted to determine whether the second packet is the initial packet of the second session;
if the second packet is the initial packet of the second session, transmit the packet to the service control module;
if the received packet is not the initial packet of the second session, transmit the second packet to a service processing executing module;
an information storing module, adapted to store the session control information transmitted by the service control module and the session forwarding information transmitted by the service control module, and transmit the session forwarding information transmitted by the service control module to the multiple interface processing modules after determining that the service processing module which the information storing module belongs to needs to perform the tunnel processing for the second packet;
the service processing executing module, adapted to perform the service processing for the second packet according to the session control information transmitted by the service control module;
a tunnel processing module, adapted to perform the tunnel processing for the second packet; and
a determining module, adapted to determine whether the one service processing module which the determining module belongs to needs to perform the tunnel processing according to a result of the tunnel processing;
if the one service processing module which the determining module belongs to needs to perform the tunnel processing, transmit the second packet after the tunnel processing is performed;
otherwise, transmit the second packet stored in the packet storing module to the another service processing module needing to perform the tunnel processing for the second packet.

6. The apparatus of claim 1, wherein
the one interface processing module is further adapted to
receive a third packet which had undergone tunnel encapsulation from the outside of the apparatus, and
transmit the third packet which had undergone the tunnel encapsulation to a service processing module needing to perform tunnel processing for the third packet through the connection module; and
the service processing module needing to perform the tunnel processing for the third packet is adapted to
perform the tunnel processing and service processing for the third packet which had undergone tunnel encapsulation, and
transmit the third packet after the tunnel processing and the service processing are performed.

7. A method for processing a packet, comprising:
determining, by an interface processing module implemented on a service board or a master control board in a network device, whether a packet received from the outside of the network device is an initial packet of a session;
if the packet is the initial packet of the session, selecting, by the interface processing module, one of multiple service processing modules implemented on the service board in the network device according to a preset selecting policy, and transmitting the packet to the service processing module selected;
if the packet is not the initial packet of the session, transmitting, by the interface processing module, the packet to a service processing module determined, the service processing module determined being a service processing module corresponding to one service processing module ID in one session forwarding information stored in the interface processing module; and
determining, by a service processing module receiving the packet, whether the packet is the initial packet of the session;
if the packet is the initial packet of the session,
transmitting the packet to a service control module implemented on the master control board in the network, and
receiving session control information generated and returned by the service control module;
if the packet is not the initial packet of the session,
storing, by the service processing module receiving the packet, the packet;
performing service processing for the packet according to session control information according to the packet;
determining whether the service processing module receiving the packet needs to perform tunnel processing for the packet;
if the service processing module receiving the packet needs to perform the tunnel processing for the packet,
transmitting, by the service processing module receiving the packet, session forwarding information returned by the service control module to all interface processing modules to be stored and
transmitting the packet after performing the tunnel processing for the packet;
otherwise, transmitting the packet stored to another service processing module needing to perform the tunnel processing for the packet, and transmitting, by the another service processing module needing to perform the tunnel processing for the packet, the packet after performing the service processing and the tunnel processing;

when the service control module receives the packet from the service processing module receiving the packet, generating, by the service control module, the session forwarding information according to the packet, and returning the session forwarding information generated to the service processing module receiving the packet, the session forwarding information comprising a service processing module ID.

8. The method of claim 7, wherein determining, by the service processing module receiving the packet, whether the service processing module needs to perform the tunnel processing for the packet comprises:

obtaining, by the service processing module receiving the packet, an egress when performing the service processing for the packet;

querying, according to the egress, an interface attribute table stored in advance;

obtaining a service processing module ID corresponding to the egress, the interface attribute table comprising a one to one relation between egresses and service processing module IDs;

if the obtained service processing module ID is the same as an ID of the service processing module receiving the packet, determining, by the service processing module receiving the packet, that the service processing module receiving the packet needs to perform the tunnel processing for the packet;

otherwise, determining that the service processing module receiving the packet does not need to perform the tunnel processing for the packet.

9. The method of claim 7, wherein determining, by the service processing module receiving the packet, whether the packet is the initial packet of the session comprises:

determining whether the packet contains an initial packet flag; if the packet contains the initial packet flag, determining that the packet is the initial packet of the session; or querying a session table in an existing session control information according to quintuple information of the packet, and determining that the packet is the initial packet of the session if there is no session item corresponding to the quintuple information.

10. The method of claim 7, wherein
the session forwarding information further comprises quintuple information, and
determining, by the interface processing module, whether the packet is the initial packet of the session comprises:

receiving, by the interface processing module, the packet from the outside of the network device and extracting quintuple information of the packet;

determining whether the session forwarding information stored by the interface processing module contains a service processing module ID corresponding to the extracted quintuple information of the packet;

if the session forwarding information does not contain the service processing module ID corresponding to the extracted quintuple information of the packet, determining that the packet is the initial packet of the session;

otherwise, determining that the packet is not the initial packet of the session.

11. The method of claim 7, wherein the selecting policy comprises a randomly selecting policy or an alternatively selecting policy.

12. The method of claim 7, wherein the packet is a packet without tunnel encapsulation.

13. The method of claim 7, when the interface processing module receives a packet which had undergone tunnel encapsulation, further comprising:

transmitting, by the interface processing module, the packet which had undergone tunnel encapsulation to a service processing module needing to perform tunnel processing for the packet which had undergone tunnel encapsulation;

performing, by the determined service processing module needing to perform tunnel processing for the packet which had undergone tunnel encapsulation, the tunnel processing and service processing for the packet which had undergone tunnel encapsulation, and transmitting a packet obtained after the tunnel processing and the service processing are performed.

14. The method of claim 7, wherein determining, by the service processing module receiving the packet, whether the service processing module receiving the packet needs to perform the tunnel processing for the packet comprises:

performing, by the service processing module receiving the packet, the tunnel processing for the packet, and obtaining a service processing module ID after performing the tunnel processing;

if the obtained service processing module ID is the same as an ID of the service processing module receiving the packet, determining, by the service processing module receiving the packet, that the service processing module receiving the packet needs to the perform tunnel processing for the packet; otherwise, determining that the service processing module receiving the packet does not need to perform the tunnel processing for the packet.

* * * * *